(12) United States Patent
Kobayashi et al.

(10) Patent No.: US 9,260,111 B2
(45) Date of Patent: Feb. 16, 2016

(54) HYBRID VEHICLE CONTROL DEVICE

(75) Inventors: Nobufusa Kobayashi, Anjo (JP);
Masato Yoshikawa, Susono (JP); Toshio Sugimura, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/237,788

(22) PCT Filed: Aug. 9, 2011

(86) PCT No.: PCT/JP2011/068203
§ 371 (c)(1),
(2), (4) Date: Feb. 7, 2014

(87) PCT Pub. No.: WO2013/021471
PCT Pub. Date: Feb. 14, 2013

(65) Prior Publication Data
US 2014/0195089 A1    Jul. 10, 2014

(51) Int. Cl.
*B60W 20/00*    (2006.01)
*B60K 6/48*    (2007.10)
*B60K 6/547*    (2007.10)
*B60W 10/06*    (2006.01)
*B60W 10/08*    (2006.01)
(Continued)

(52) U.S. Cl.
CPC .............. *B60W 20/40* (2013.01); *B60K 6/48* (2013.01); *B60K 6/547* (2013.01); *B60W 10/02* (2013.01); *B60W 10/06* (2013.01); *B60W 10/08* (2013.01);
(Continued)

(58) Field of Classification Search
CPC ............ F02N 11/006; F02N 11/0818; F02N 2300/2002; B60W 20/40; B60W 10/02; B60W 10/06; B60W 10/08; B60W 2510/0685; B60K 6/48; B60K 6/547; B60K 2006/4825; F02D 29/02; F02D 41/062; Y02T 10/48; Y02T 10/6221; Y02T 10/6252; Y10S 903/93
USPC ........................................................ 701/22
See application file for complete search history.

(56) References Cited

U.S. PATENT DOCUMENTS

2010/0125019 A1 *  5/2010  Tabata ................. B60K 6/365
477/3
2011/0239988 A1 * 10/2011  Reiche ................. F02P 5/1506
123/406.76

(Continued)

FOREIGN PATENT DOCUMENTS

CN    101045453 A    10/2007
CN    101875298 A    11/2010
(Continued)

OTHER PUBLICATIONS

International Search Report issued Nov. 8, 2011, in PCT/JP11/068203 filed Aug. 9, 2011.

*Primary Examiner* — Fadey Jabr
*Assistant Examiner* — Aaron L Troost
(74) *Attorney, Agent, or Firm* — Oblon, McClelland, Maier & Neustadt, L.L.P.

(57) ABSTRACT

A control device of a hybrid vehicle has an engine and an electric motor, the hybrid vehicle being configured to perform motor running using only the electric motor for running and engine running using at least the engine for running, the control device comprising: a first starting portion starting the engine by using the electric motor; and a second starting portion starting the engine without using the electric motor, the control device being configured to expand a range of performing the motor running when the engine is started by the second starting portion as compared to when the engine is started by the first starting portion.

8 Claims, 6 Drawing Sheets

(51) Int. Cl.
*B60W 10/02* (2006.01)
*F02N 11/00* (2006.01)
*F02N 11/08* (2006.01)
*F02D 29/02* (2006.01)
*F02D 41/06* (2006.01)

(52) U.S. Cl.
CPC .......... *F02N 11/006* (2013.01); *F02N 11/0818* (2013.01); *B60K 2006/4825* (2013.01); *B60W 2510/0685* (2013.01); *F02D 29/02* (2013.01); *F02D 41/062* (2013.01); *F02N 2300/2002* (2013.01); *Y02T 10/48* (2013.01); *Y02T 10/6221* (2013.01); *Y02T 10/6252* (2013.01); *Y10S 903/93* (2013.01)

(56) References Cited

U.S. PATENT DOCUMENTS

2011/0304156 A1* 12/2011 Schiek ................. B60W 10/06
290/38 E
2012/0143412 A1* 6/2012 Bissontz ................. B60K 6/48
701/22

FOREIGN PATENT DOCUMENTS

| JP | 2010-23660 | 2/2010 |
| JP | 2010-52610 | 3/2010 |
| JP | 2010-195259 | 9/2010 |
| JP | 2011-57135 | 3/2011 |

* cited by examiner

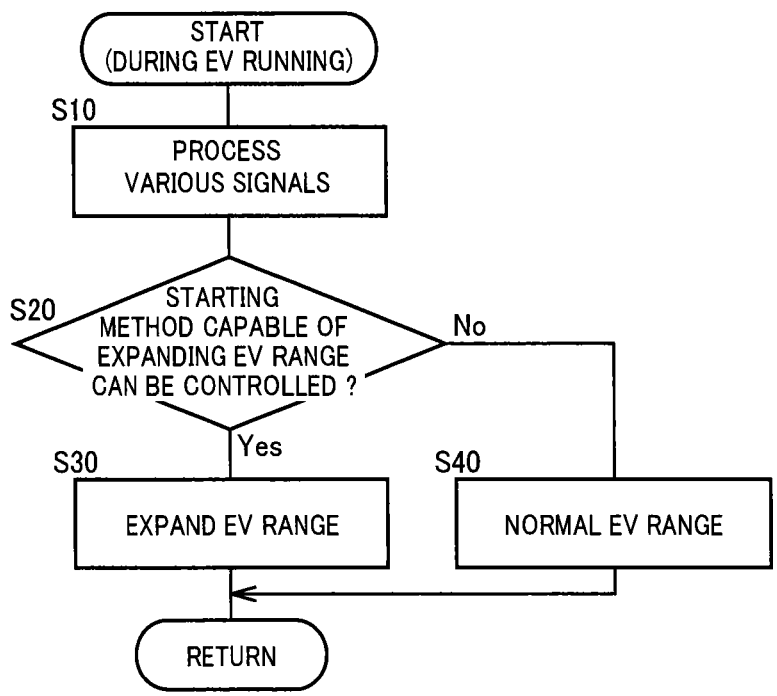

HYBRID VEHICLE CONTROL DEVICE

TECHNICAL FIELD

The present invention relates to a control device of a hybrid vehicle including an engine and an electric motor and capable of switching motor running and engine running.

BACKGROUND ART

A hybrid vehicle is well-known that includes an engine and an electric motor acting as a drive force source for running. In such a hybrid vehicle, switchover is made between, for example, motor running (EV running) for running with only the electric motor used as the drive force source for running and engine running (EHV running) for running with at least the engine used as the drive force source for running, based on a drive request amount (e.g., request drive torque, request drive force, and request drive power). For example, a switching point for switching the EV running and the EHV running, i.e., a switching line defining a motor running range (EV range) for performing the EV running and an engine running range (EHV range) for performing the EHV running, is changed based on a vehicle state. For example, Patent Document 1 proposes that if a state making an engine start difficult is detected at the time of previous engine start, an engine start determination threshold value (e.g., corresponding to the switching point) for the drive request amount is made smaller, i.e., the EV range is made smaller, to start the engine earlier so as to detect an abnormality of the engine in the early stage.

PRIOR ART DOCUMENTS

Patent Documents

Patent Document 1: Japanese Laid-Open Patent Publication No. 2010-52610
Patent Document 2: Japanese Laid-Open Patent Publication No. 2010-195259
Patent Document 3: Japanese Laid-Open Patent Publication No. 2010-23660
Patent Document 4: Japanese Laid-Open Patent Publication No. 2011-57135

SUMMARY OF THE INVENTION

Problem to Be Solved by the Invention

If the electric motor is also used for engine start, reserve power must be left for an engine start torque required for the engine start and, therefore, the EV range is defined as a range supportable with a torque equal to or less than the torque acquired by subtracting the engine start torque from the maximum electric motor torque that can be output by the electric motor. In this regard, it is proposed that the EV range is expanded when the EV running is actively requested for fuel efficiency improvement by user's operation with a switch etc. However, the expansion of the EV range in this way means that a portion or all of the reserve power left as the engine start torque is diverted to the EV running. Therefore, an output torque (drive torque) of the vehicle is reduced by the torque diverted from the reserve power to the EV running at the time of engine start and the start shock may deteriorate, resulting in reduction in drivability. As described above, the expansion of the EV range for fuel efficiency and the avoidance of reduction in drivability may not be satisfied at the same time. The problem described above is not known and no proposal has been made on expanding the EV range without deteriorating the start shock.

The present invention was conceived in view of the situations and it is therefore an object of the present invention to provide a control device of a hybrid vehicle capable of expanding the EV range to improve fuel efficiency without reduction in drivability.

Means for Solving the Problem

To achieve the object, the first aspect of the invention provides a control device of (a) a hybrid vehicle having an engine and an electric motor, the hybrid vehicle being configured to perform motor running using only the electric motor for running and engine running using at least the engine for running, the control device comprising: a first starting portion starting the engine by using the electric motor; and a second starting portion starting the engine without using the electric motor, wherein (b) when the engine is started by the second starting portion, a range of performing the motor running is expanded as compared to when the engine is started by the first starting portion.

Effects of the Invention

As a result, if the engine start is performed by the second starting portion without the need for compensating the engine start with the electric motor, the electric motor can be operated for the motor running to the drive request amount higher by the portion of the compensation of the engine start without deteriorating the start shock. In other words, if the engine start is performed by the second starting portion, even when the motor running is performed by using the portion of the compensation of the engine start with the electric motor, the start shock is not deteriorated. Therefore, the range (EV range) performing the motor running can be expanded to improve the fuel efficiency without reduction in drivability.

The second aspect of the invention provides the control device of a hybrid vehicle recited in the first aspect of the invention, wherein the second starting portion injects fuel into a cylinder of the engine during stop of rotation and causes an explosion to start the engine (i.e., perform ignition start), and wherein if it is determined that a next engine start can be performed by the second starting portion during stop of rotation of the engine, the range of performing the motor running is expanded. As a result, since a rotation stop position of the engine (a crank angle during stop of engine rotation) is key to the success of engine start for the ignition start, whether the next engine start can be performed by the ignition start can certainly be determined while the engine is stopped rotating and, therefore, both the engine startability and the expansion of the EV range can be satisfied by deciding the EV range after an engine starting method is decided during stop of engine rotation, i.e., the start shock is not deteriorated by expanding the EV range.

The third aspect of the invention provides the control device of a hybrid vehicle recited in the first or second aspect of the invention, wherein the first starting portion starts the engine while the engine is rotationally driven by the electric motor, and wherein when a smaller output torque of the electric motor is required for rotationally driving the engine, the range of performing the motor running is more expanded. As a result, if the engine is started by the first starting portion, the EV range can be expanded as much as possible. Therefore, as compared to uniformly reducing the EV range as compared to the case of starting the engine by the second starting portion, the EV range can be expanded to improve the fuel efficiency without reduction in drivability.

The fourth aspect of the invention provides the control device of a hybrid vehicle recited in any one of the first to third aspects of the invention, comprising a clutch connecting/disconnecting a power transmission path between the engine and the electric motor, wherein the motor running refers to running with only the electric motor used as a drive force source for running while the clutch is released, wherein the first starting portion starts the engine while the clutch is controlled toward engagement, and wherein the second starting portion starts the engine while the clutch is kept released. As a result, the engine can properly be started by any of the first starting portion and the second starting portion and, if the engine start is performed by the second starting portion, the electric motor can be operated for motor running up to a drive request amount higher by the portion of the compensation of the engine start without deteriorating the start shock.

Further, to achieve the object, the fifth aspect of the invention provides a control device of (a) a hybrid vehicle having an engine and an electric motor, the hybrid vehicle being configured to perform motor running using only the electric motor for running and engine running using at least the engine for running, the control device comprising: a first starting portion starting the engine by using the electric motor; and a second starting portion injecting fuel into a cylinder of the engine during stop of rotation and causing an explosion to start the engine, wherein (b) when the engine is started by the second starting portion, a range of performing the motor running is expanded as compared to when the engine is started by the first starting portion. Consequently, the range (EV range) performing the motor running can be expanded to improve the fuel efficiency without reduction in drivability as is the case of the first aspect of the invention.

Further, to achieve the object, the sixth aspect of the invention provides a control device of (a) a hybrid vehicle having an engine and an electric motor, the hybrid vehicle being configured to perform motor running using only the electric motor for running and engine running using at least the engine for running, the control device comprising: a first starting portion starting the engine by using the electric motor; and a second starting portion starting the engine by using a starter motor, wherein (b) when the engine is started by the second starting portion, a range of performing the motor running is expanded as compared to when the engine is started by the first starting portion. Consequently, the range (EV range) performing the motor running can be expanded to improve the fuel efficiency without reduction in drivability as is the case of the first aspect of the invention.

BRIEF DESCRIPTION OF THE DRAWINGS

FIG. 8 is a flowchart for explaining a main portion of a control operation of the electronic control device, i.e., a control operation for expanding the EV range to improve the fuel efficiency without reduction in drivability.

MODES FOR CARRYING OUT THE INVENTION

Figure 1:
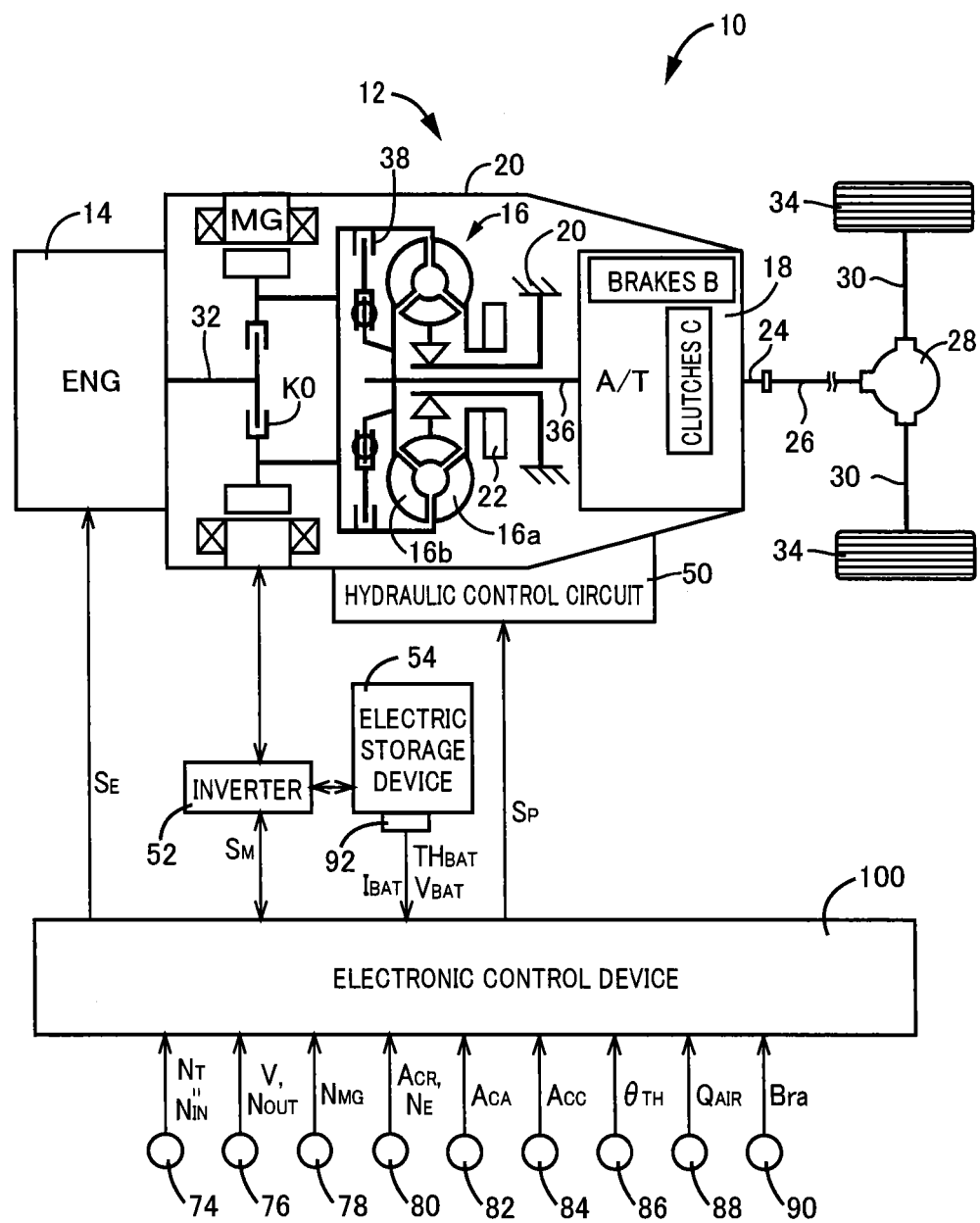
FIG. 1 is a diagram for explaining a general configuration of a power transmission path making up a hybrid vehicle to which the present invention is applied, and is a diagram for explaining a main portion of a control system disposed in the vehicle.

In the present invention, preferably, the hybrid vehicle further includes an automatic transmission transmitting a power from the drive force source for running toward drive wheels. This automatic transmission is made up of a single transmission itself, a transmission having a hydraulic power transmission device such as a torque converter, or a transmission having a sub-transmission. This transmission is made up of a known planetary gear automatic transmission having a plurality of sets of rotating elements (rotating members) of a planetary gear device selectively coupled by engagement devices to achieve a plurality of gear stages (shift stages) in an alternative manner; a synchronous meshing type parallel two-shaft automatic transmission that is a synchronous meshing type parallel two-shaft transmission including pairs of always meshing change gears between two shafts to put any of the pairs of the change gears into a power transmission state by a synchronizing device in an alternative manner and that has shift stages automatically switchable by the synchronizing device driven by a hydraulic actuator; a so-called DCT (Dual Clutch Transmission) that is a synchronous meshing type parallel two-shaft automatic transmission and that is a transmission of a type having two systems of input shafts with clutches respectively linked to the input shafts of the systems and further respectively linked to even stages and odd stages; a so-called belt type continuously variable transmission having a transmission belt acting as a power transmission member wrapped around a pair of variable pulleys having a variable effective diameter so as to continuously vary a gear ratio in a stepless manner; or a so-called traction type continuously variable transmission having a pair of cones rotated around a common shaft center and a plurality of rollers capable of rotating around a rotation center intersecting with the shaft center such that the rollers are interposed and pressed between the pair of the cones to change an intersection angle between the rotation center of the rollers and the shaft center so as to vary a gear ratio.

Preferably, engagement devices such as multi-plate and single-plate clutches and brakes engaged by a hydraulic actuator or belt type brakes are widely used for the engagement devices of the planetary gear automatic transmission. Although an oil pump supplying operating oil for actuating the engagement devices may be an oil pump driven by, for example, a drive force source for running to discharge the operating oil, the oil pump may be driven by a dedicated electric motor etc., disposed separately from the drive force source for running.

Preferably, it is desirable in terms of responsiveness that a hydraulic control circuit including the engagement devices directly supplies, for example, an output oil pressure of a linear solenoid valve to each of hydraulic actuators (hydraulic cylinders) of the engagement devices; however, the output oil pressure of the linear solenoid valve can be used as a pilot oil pressure to control a shift control valve such that the operating oil is supplied from the control valve to the hydraulic actuators.

Preferably, the linear solenoid valves are disposed in one-to-one correspondence to each of a plurality of engagement devices, for example; however, if a plurality of the engagement devices exists that is not engaged or subjected to engagement/release control at the same time, a linear solenoid valve common to these devices can be disposed, and various other forms are available. Hydraulic control of all the engagement devices may not necessarily be provided by the linear solenoid valves, and the hydraulic control may partially or entirely be provided by an adjusting means other than the linear solenoid valves such as duty control of an ON-OFF solenoid valve. The phrase "supplying an oil pressure" as used herein means that "causing an oil pressure to act on" or "supplying operating oil controlled to the oil pressure".

Preferably, an internal combustion engine such as a gasoline engine is widely used as the engine.

Preferably, a wet or dry engagement device is used as the clutch connecting/disconnecting the power transmission path between the engine and the electric motor.

An example of the present invention will now be described in detail with reference to the drawings.

EXAMPLE

FIG. 1 is a diagram for explaining a general configuration of a power transmission path from an engine 14 to drive wheels 34 making up a hybrid vehicle 10 (hereinafter referred to as a vehicle 10) to which the present invention is applied, and is a diagram for explaining a main portion of a control system disposed in the vehicle 10 for output control of the engine 14 acting as a drive force source for running, shift control of an automatic transmission 18, drive control of an electric motor MG acting as a drive force source for running, etc.

In FIG. 1, a vehicle power transmission device 12 (hereinafter referred to as a power transmission device 12) includes, an engine connecting/disconnecting clutch K0, the electric motor MG, a torque converter 16, an oil pump 22, the automatic transmission 18, etc., in order from the engine 14 side in a transmission case 20 (hereinafter referred to as a case 20) acting as a non-rotating member attached to a vehicle body by bolts etc. The power transmission device 12 also includes a propeller shaft 26 coupled to a transmission output shaft 24 that is an output rotating member of the automatic transmission 18, a differential gear device (differential gear) 28 coupled to the propeller shaft 26, a pair of axles 30 coupled to the differential gear device 28, etc. The power transmission device 12 configured as described above is preferably used in the vehicle 10 of the FR (front-engine rear-drive) type, for example. In the power transmission device 12, if the engine connecting/disconnecting clutch K0 is engaged, a power of the engine 14 is transmitted from an engine coupling shaft 32 coupling a crankshaft 15 (see FIG. 2) of the engine 14 and the engine connecting/disconnecting clutch K0, sequentially through the engine connecting/disconnecting clutch K0, the torque converter 16, the automatic transmission 18, the propeller shaft 26, the differential gear device 28, the pair of the axles 30, etc., to a pair of the drive wheels 34.

The torque converter 16 is a hydraulic power transmission device transmitting a drive force input to a pump impeller 16a from a turbine impeller 16b coupled to a transmission input shaft 36 via fluid toward the automatic transmission 18. The torque converter 16 includes a lockup clutch 38 directly coupling the pump impeller 16a and the turbine impeller 16b.

The electric motor MG is a so-called motor generator having a function of a motor generating a mechanical drive force from electric energy and a function of an electric generator generating electric energy from mechanical energy. In other words, the electric motor MG may act as a drive force source for running generating a drive force for running instead of the engine 14 that is a power source or along with the engine 14. The electric motor MG also performs operations such as generating electric energy through regeneration from a drive force generated by the engine 14 or a driven power (mechanical energy) input from the side of the drive wheels 34 to accumulate the electric energy via an inverter 52 into an electric storage device 54. The electric motor MG is coupled to a power transmission path between the engine connecting/disconnecting clutch K0 and the torque converter 16 (i.e., operatively coupled to the pump impeller 16a) and power is mutually transmitted between the electric motor MG and the pump impeller 16a. Therefore, the electric motor MG is coupled to the transmission input shaft 36 that is an input rotating member of the automatic transmission 18 in a power transmittable manner as is the case with the engine 14.

The engine connecting/disconnecting clutch K0 is a wet multi-plate type hydraulic friction engagement device in which a plurality of friction plates overlapped with each other is pressed by a hydraulic actuator, for example, and is subjected to engagement/release control by a hydraulic control circuit 50 disposed in the power transmission device 12 by using an oil pressure generated by the oil pump 22 as an original pressure. In the engagement/release control, a power-transmittable torque capacity of the engine connecting/disconnecting clutch K0, i.e., an engagement force of the engine connecting/disconnecting clutch K0 is varied, for example, continuously, through pressure adjustment of a linear solenoid valve etc., in the hydraulic control circuit 50. The engine connecting/disconnecting clutch K0 includes a pair of clutch rotating members (a clutch hub and a clutch drum) relatively rotatable in the released state thereof and one of the clutch rotating members (the clutch hub) is relatively non-rotatably coupled to the engine coupling shaft 32 while the other clutch rotating member (the clutch drum) is relatively non-rotatably coupled to the pump impeller 16a of the torque converter 16. Because of such a configuration, the engine connecting/disconnecting clutch K0 rotates the pump impeller 16a integrally with the engine 14 via the engine coupling shaft 32 in the engaged state. Therefore, in the engaged state of the engine connecting/disconnecting clutch K0, the drive force from the engine 14 is input to the pump impeller 16a. On the other hand, in the released state of the engine connecting/disconnecting clutch K0, the power transmission between the pump impeller 16a and the engine 14 is interrupted. As described above, since the electric motor MG is operatively coupled to the pump impeller 16a, the engine connecting/disconnecting clutch K0 obviously acts as a clutch connecting/disconnecting a power transmission path between the engine 14 and the torque converter 16 and also acts as a clutch connecting/disconnecting a power transmission path between the engine 14 and the electric motor MG.

The automatic transmission 18 is coupled to the electric motor MG without via the engine connecting/disconnecting clutch K0 in a power transmittable manner and makes up a portion of the power transmission path from the engine 14 to the drive wheels 34 to transmit the power from the drive force source for running (the engine 14 and the electric motor MG) toward the drive wheels 34. The automatic transmission 18 is a known planetary-gear type multistage transmission having a plurality of shift stages (gear stages) selectively establish through a shift made by engagement and release of a plurality of hydraulic friction engagement devices such as clutches C and brakes B, for example. In the automatic transmission 18, each of the clutches C and the brakes B is subjected to the engagement/release control by the hydraulic control circuit 50 to establish a predetermined gear stage (shift stage) depending on accelerator operation of a driver, a vehicle speed V, etc.

Figure 2:
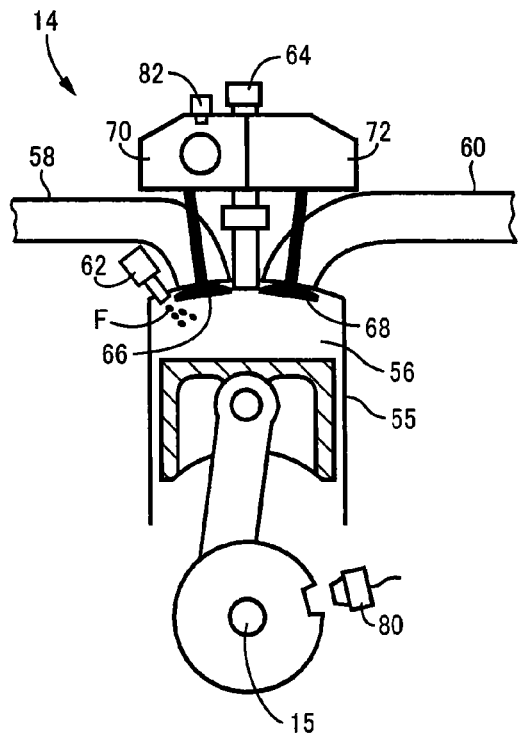
FIG. 2 is a diagram for explaining a general configuration of the engine.

FIG. 2 is a diagram for explaining a general configuration of the engine 14. In FIG. 2, the engine 14 is, for example, a known automotive gasoline engine directly injecting fuel into cylinders 55 and is, for example, an in-line four-cylinder engine in this example. The engine 14 is a four-stroke engine completing one cycle made up of an intake stroke, a compression stroke, an expansion stroke, and an exhaust stroke while the crankshaft 15 rotates twice. The engine 14 includes a combustion chamber 56 disposed between a cylinder head and a piston, an intake pipe 58 connected to an intake port of the combustion chamber 56, an exhaust pipe 60 connected to an exhaust port of the combustion chamber 56, a fuel injection device 62 disposed on the cylinder head and directly injecting fuel F into the combustion chamber 56, an ignition device 64 igniting air-fuel mixture in the combustion chamber 56, an intake valve 66 opening or closing the intake port of the combustion chamber 56, an exhaust valve 68 opening or closing the exhaust port of the combustion chamber 56, an intake valve drive device 70 reciprocating the intake valve 66 in synchronization with the rotation of the crankshaft 15 for opening/closing actuation, and an exhaust valve drive device 72 reciprocating the exhaust valve 68 in synchronization with the rotation of the crankshaft 15 for opening/closing actuation.

The intake valve drive device 70 also has a function of changing opening/closing timing etc., of the intake valve 66 as needed and acts as an intake valve opening/closing timing changing device changing the opening/closing timing of the intake valve 66, for example. Although various operating principles of the intake valve drive device 70 are generally known, the intake valve drive device 70 may be, for example, a cam mechanism operated in conjunction with the rotation of the crankshaft 15, in which any of cams having shapes different from each other is selectively used through hydraulic control or electric control for the opening/closing actuation of the intake valve 66, or may utilize the cam mechanism operated in conjunction with the rotation of the crankshaft 15 along with a mechanism correcting the operation of the cams of the cam mechanism through hydraulic control or electric control for the opening/closing actuation of the intake valve 66. In short, for example, the intake valve drive device 70 is mainly made up of the cam mechanism and has a function as an intake valve opening/closing timing changing device advancing or delaying both the opening timing and the closing timing of the intake valve 66.

Figure 3:
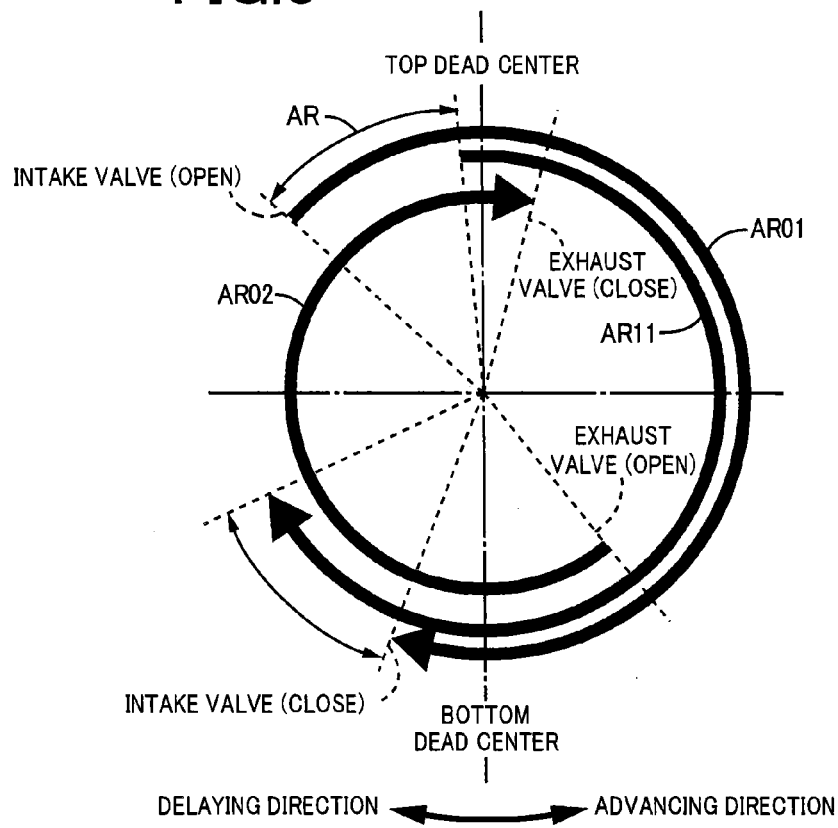
FIG. 3 is a diagram for explaining a relationship of opening/closing timing of an intake valve and an exhaust valve.

FIG. 3 is a diagram for explaining a relationship of the opening/closing timing of the intake valve 66 and the exhaust valve 68. In FIG. 3, arrows AR01 and AR11 indicate a range of a crank angle $A_{CR}$ at which the intake valve 66 is opened, i.e., an opening period of the intake valve 66 and an arrow AR02 indicates a range of the crank angle $A_{CR}$ in which the exhaust valve 68 is opened, i.e., an opening period of the exhaust valve 68. The arrow AR01 indicates a state of the opening/closing timing of the intake valve 66 shifted by the intake valve drive device 70 in the advancing direction to the maximum, while the arrow AR11 indicates a state of the opening/closing timing of the intake valve 66 shifted by the intake valve drive device 70 in the delaying direction to the maximum. As described above, in the engine 14 of this example, the opening/closing timing of the intake valve 66 can be changed within a range of arrows AR by the intake valve drive device 70.

Returning to FIG. 1, the vehicle 10 includes an electronic control device 100 including a control device of the vehicle 10 related to hybrid drive control, for example. The electronic control device 100 includes a so-called microcomputer including a CPU, a RAM, a ROM, and an I/O interface, for example, and the CPU executes signal processes in accordance with programs stored in advance in the ROM, while utilizing a temporary storage function of the RAM, to provide various controls of the vehicle 10. For example, the electronic control device 100 provides the output control of the engine 14, the drive control of the electric motor MG including regenerative control of the electric motor MG; the shift control of the automatic transmission 18, torque capacity control of the lockup clutch 38, torque capacity control of the engine connecting/disconnecting clutch K0, etc., and is configured separately as needed for the engine control, the electric motor control, the hydraulic control (the shift control), etc. The electronic control device 100 is supplied with each of various signals (e.g., a turbine rotation speed $N_T$, i.e., transmission input rotation speed $N_{IN}$, a transmission output rotation speed $N_{OUT}$ corresponding to the vehicle speed V, an electric motor rotation speed $N_{MG}$, the crank angle $A_{CR}$ and an engine rotation speed $N_E$, a camshaft angle $A_{CA}$, an accelerator opening degree Acc, a throttle valve opening degree $\theta_{TH}$, an intake air amount $Q_{AIR}$, a brake operation amount Bra, a battery temperature $TH_{BAT}$, a battery charging/discharging current $I_{BAT}$, and a battery voltage $V_{BAT}$ of the electric storage device 54) detected by various sensors (e.g., rotation speed sensors 74, 76, 78, a crank position sensor 80, an intake valve side cam position sensor 82, an accelerator opening degree sensor 84, a throttle valve opening degree sensor 86, an airflow meter 88, a foot brake sensor 90, and a battery sensor 92). The electronic control device 100 outputs, for example, an engine control command signal $S_E$ for controlling an operation of the engine 14, an electric motor control command signal $S_M$ for controlling an operation of the electric motor MG, and an oil pressure command signal $S_P$ for controlling the hydraulic actuators of the engine connecting/disconnecting clutch K0 and the clutches C and the brakes B of the automatic transmission 18. The electronic control device 100 sequentially calculates a state of charge (charging capacity) SOC of the electric storage device 54 based on the battery temperature $TH_{BAT}$, the battery charging/discharging current $I_{BAT}$, and the battery voltage $V_{BAT}$, for example.

Figure 4:
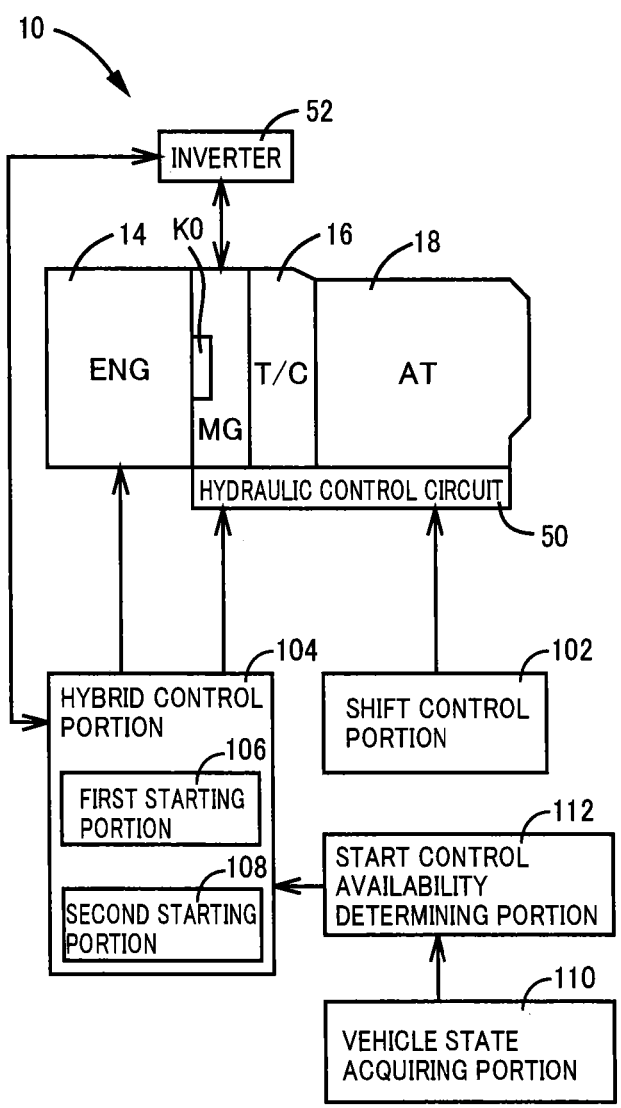
FIG. 4 is a functional block diagram for explaining a main portion of a control function of an electronic control device.

FIG. 4 is a functional block diagram for explaining a main portion of the control function of the electronic control device 100. In FIG. 4, a shift control means, i.e., a shift control portion 102, determines whether a shift of the automatic transmission 18 should be performed, i.e., determines a shift stage to be achieved by the automatic transmission 18, based on a vehicle state (e.g., an actual vehicle speed V and the accelerator opening degree Acc) from known relationship (shift diagram, shift map; see FIG. 7) stored in advance by using the vehicle speed V and the accelerator opening degree Acc (or a transmission output torque $T_{OUT}$ etc.,) as variables, for example, and provides automatic shift control of the automatic transmission 18 such that the determined shift stage is acquired.

A hybrid control means, i.e., a hybrid control portion 104, has a function as an engine drive control portion controlling drive of the engine 14 and a function as an electric motor operation control portion controlling the operations of the electric motor MG as a drive force source or an electric generator through the inverter 52, and provides the hybrid drive control by the engine 14 and the electric motor MG through these control functions. The hybrid control portion 104 calculates a vehicle request torque as a drive request amount based on the accelerator opening degree Acc and the vehicle speed V and controls the drive force source for running so as to achieve an output torque of the drive force source for running (the engine 14 and the electric motor MG) such that the vehicle request torque is acquired in consideration of a transmission loss, an accessory load, a shift stage of the automatic transmission 18, the charge capacity SOC of the electric storage device 54, etc.

More specifically, for example, if the vehicle request torque is within a range that can be covered solely by an output torque (electric motor torque) $T_{MG}$ of the electric motor MG, the hybrid control portion 104 sets a running mode to a motor running mode (hereinafter, EV mode) and performs motor running (EV running) for running with only the electric motor MG used as the drive force source for running. On the other hand, for example, if the vehicle request torque is within a range that cannot be covered unless at least an output torque (engine torque) $T_E$ of the engine 14 is used, the hybrid control portion 104 sets the running mode to an engine running mode, i.e., a hybrid running mode (hereinafter, EHV mode), and performs engine running, i.e., hybrid running (EHV running), for running with at least the engine 14 used as the drive force source for running. As described above, for example, the hybrid control portion 104 performs the EV running in a motor running range (EV range) that is a range with a relatively low drive request amount such that the vehicle request torque can be covered solely by the electric motor torque $T_{MG}$, and performs the EHV running in an engine running range (EHV range) that is a range with a relatively high drive request amount such that the vehicle request torque cannot be covered unless at least the engine torque $T_E$ is used.

The drive request amount may be defined by using not only the vehicle request torque, i.e., a request drive torque at the drive wheels 34, but also a request drive force or request drive power at the drive wheels 34, a request transmission output torque at the transmission output shaft 24, a request transmission input torque at the transmission input shaft 36, etc. The drive request amount may be defined by simply using the accelerator opening degree Acc, the throttle valve opening degree $\theta_{TH}$, the intake air amount $Q_{AIR}$, etc.

If the EV running is performed, the hybrid control portion 104 releases the engine connecting/disconnecting clutch K0 to interrupt the power transmission path between the engine 14 and the torque converter 16 and causes the electric motor MG to output the electric motor torque $T_{MG}$ for the EV running. On the other hand, if the EHV running is performed, the hybrid control portion 104 engages the engine connecting/disconnecting clutch K0 to connect the power transmission path between the engine 14 and the torque converter 16 and causes the engine 14 to output the engine torque $T_E$ required for the EHV running while causing the electric motor MG to output an assist torque as needed.

If a transition of the vehicle state (e.g., the actual vehicle speed V and the accelerator opening degree Acc) is made from the EV range to the EHV range due to, for example, an increase in the accelerator opening degree Acc or an increase in the vehicle speed V during the EV running, the hybrid control portion 104 determines that an engine start request is made, switches the running mode from the EV mode to the EHV mode, and starts the engine 14 to perform the EHV running.

For example, a starting method of the engine 14 can roughly be categorized into two methods, i.e., a first starting method of starting the engine 14 by using the electric motor MG and a second starting method of starting engine 14 without using the electric motor MG, which are used solely or in combination.

The first starting method is to start the engine while the engine connecting/disconnecting clutch K0 is controlled toward engagement (from another viewpoint, while the engine 14 is rotationally driven by the electric motor MG), for example. Since the first starting method requires an engine start torque $T_{MG}s$ that is a torque necessary for the engine start, the EV running is desirably performed with reserve power left for the engine start torque $T_{MG}s$ in preparation for the engine start. Therefore, if the first starting method is employed, the EV range is desirably defined as a range that can be supported by a torque equal to or less than the torque acquired by subtracting the engine start torque $T_{MG}s$ from a maximum electric motor torque $T_{MG}$max that can be output by the electric motor MG at the time point during the EV running.

On the other hand, the second starting method is to start the engine while the engine connecting/disconnecting clutch K0 is kept released, for example, and this may be an ignition start, in which fuel is injected into a predetermined cylinder (e.g., into a cylinder in the expansion stroke) out of the cylinders of the rotation-stopped or non-operating engine 14, or an engine start using a known starter motor (not depicted) disposed separately from the electric motor MG Since the second starting method does not require the engine start torque $T_{MG}s$, the engine start torque $T_{MG}s$ can be used as an EV running torque $T_{MG}ev$ transmitted toward the drive wheels 34 for the EV running and the EV range can be expanded as compared to the first starting method. However, the second starting method cannot be performed in some cases as described later.

Even when the first starting method is employed, the EV range can be expanded. For example, when the EV running is actively requested for fuel efficiency improvement by user's operation with an EV switch (not depicted) for performing the EV running, the reserve power left as the engine start torque $T_{MG}s$ can partially or entirely be diverted to the EV running torque $T_{MG}ev$ to expand the EV range. However, if the EV range is expanded in this way, a drive torque is reduced by the torque diverted from the engine start torque $T_{MG}s$ to the EV running torque $T_{MG}ev$ at the time of engine start and the start shock may deteriorate, resulting in reduction in drivability. An output limit Wout of the electric storage device 54 can temporarily be raised to increase the EV running torque $T_{MG}ev$ and expand the EV range. However, since a load cannot be applied to the electric storage device 54 in some cases because of the requirement of the battery temperature $TH_{BAT}$ etc., the reproducibility of the expansion of the EV range may not be ensured.

Detailed description will hereinafter be made of the expansion of the EV range for fuel efficiency improvement without reduction in drivability with attention focused on features of the two methods of starting the engine 14.

Figure 5:
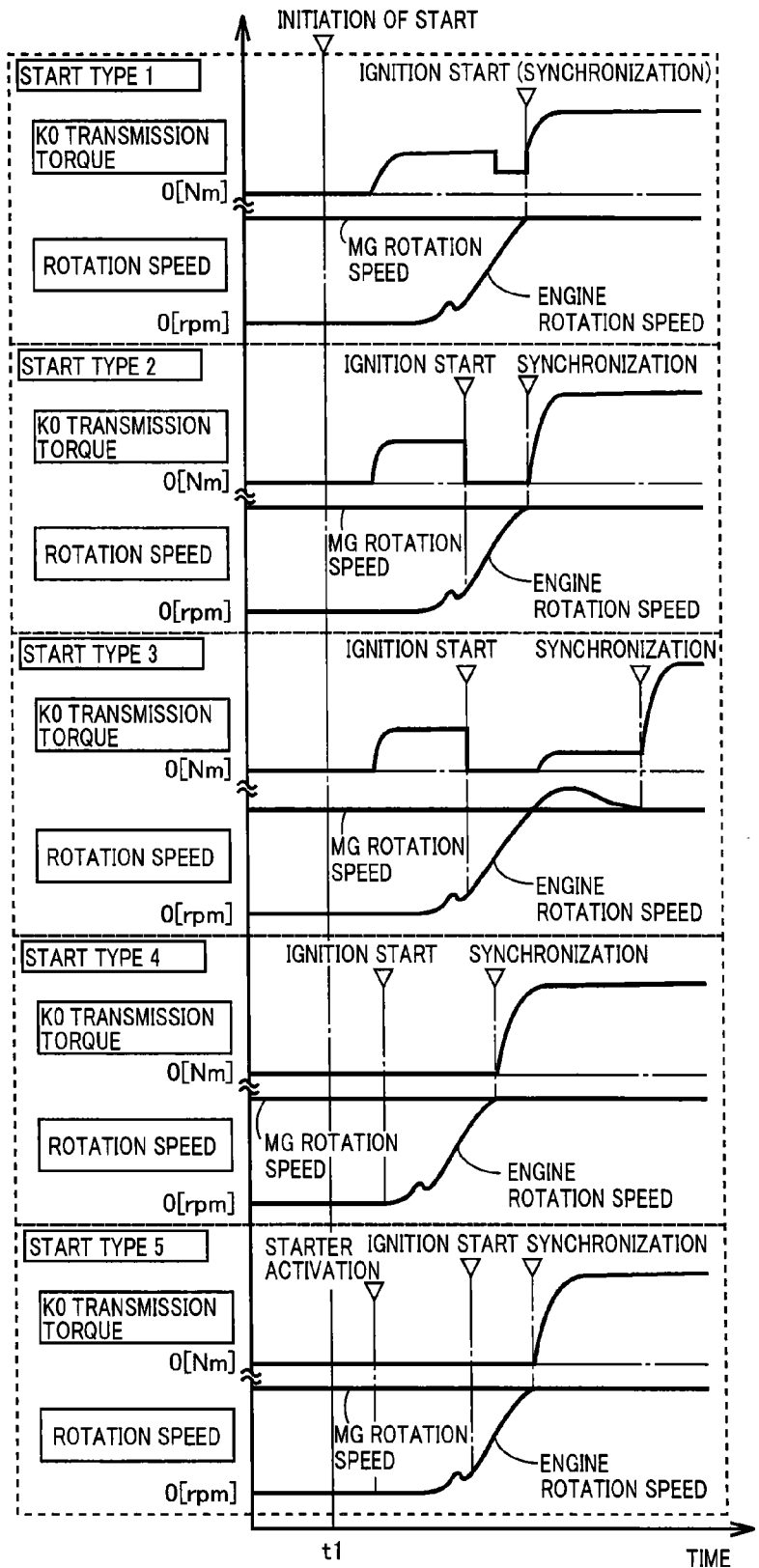
FIG. 5 is a time chart for explaining control forms by a start type.
Figure 6:
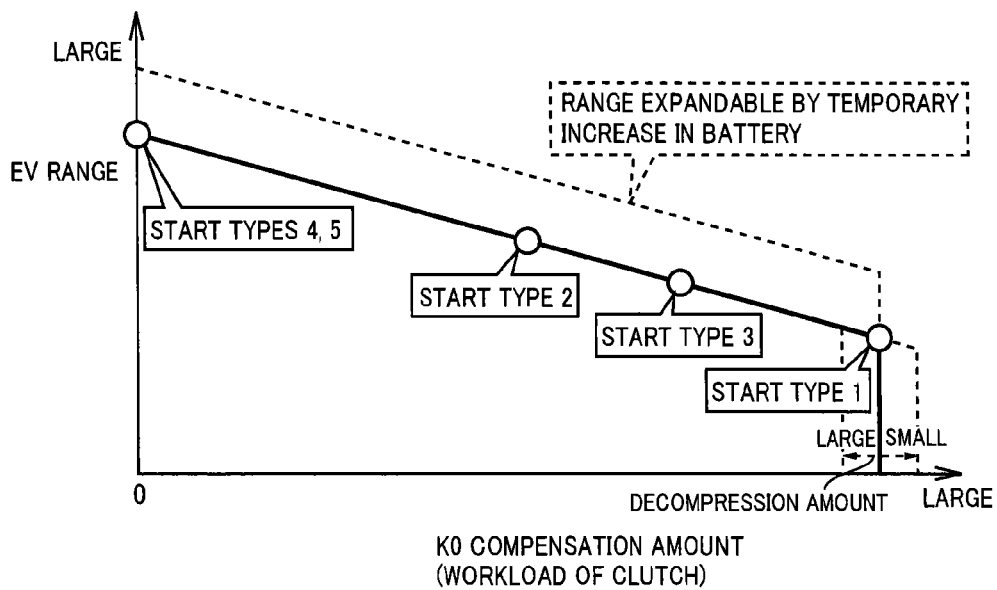
FIG. 6 is a diagram for explaining a size of the EV range by a start type.

FIG. 5 is a time chart for explaining control forms by a start type. FIG. 6 is a diagram for explaining a size of the EV range by a start type. In FIG. 5, start types 1 to 3 are engine starts in the first starting method and start types 4 and 5 are engine starts in the second starting method. Time t1 of FIG. 5 is a time point at which the initiation of start of the engine 14 is determined because of a transition from the EV range to the EHV range.

Specifically, when the initiation of start of the engine 14 is determined in the start type 1, a K0 transmission torque $T_{K0}$ corresponding to a torque capacity of the engine connecting/disconnecting clutch K0 is controlled to a torque for allowing transmission of the engine start torque $T_{MG}s$ toward the engine 14, thereby raising the engine rotation speed $N_E$. When it is determined that the engine rotation speed $N_E$ is raised to the electric motor rotation speed $N_{MG}$ (or near the electric motor rotation speed $N_{MG}$) and synchronized (or nearly synchronized), the engine 14 is started by initiating an engine ignition, a fuel supply, etc. After the start of the engine, the K0 transmission torque $T_{K0}$ is controlled to a torque for allowing proper transmission of the engine torque $T_E$ toward the drive wheels 34.

When the initiation of start of the engine 14 is determined in the start type 2, the K0 transmission torque $T_{K0}$ is controlled to a torque for allowing transmission of the engine start torque $T_{MG}$s toward the engine 14, thereby raising the engine rotation speed $N_E$. When it is determined that the engine rotation speed $N_E$ is raised to a predetermined rotation speed enabling a complete explosion, the engine 14 is started by initiating the engine ignition, the fuel supply, etc., and the K0 transmission torque $T_{K0}$ is once lowered to zero torque. When it is determined that the engine rotation speed $N_E$ is increased to the electric motor rotation speed $N_{MG}$ and synchronized by a self-sustaining operation of the engine 14 after the engine start, the K0 transmission torque $T_{K0}$ is controlled to a torque for allowing proper transmission of the engine torque $T_E$ toward the drive wheels 34.

The start type 3 is the same as the start type 2 until the engine 14 is started. When it is determined that the engine rotation speed $N_E$ exceeds the electric motor rotation speed $N_{MG}$ and overshoots after the engine start, the K0 transmission torque $T_{K0}$ is controlled to a torque for allowing reduction of the engine rotation speed $N_E$ to the electric motor rotation speed $N_{MG}$. When it is determined that the engine rotation speed $N_E$ is reduced to the electric motor rotation speed $N_{MG}$ and synchronized, the K0 transmission torque $T_{K0}$ is controlled to a torque for allowing proper transmission of the engine torque $T_E$ toward the drive wheels 34.

The start type 4 is an engine start by the ignition start. When the initiation of start of the engine 14 is determined in the start type 4, fuel supply is started to the combustion chamber 56 in a cylinder in, for example, an expansion stroke of the engine 14 stopped rotating and the ignition of the engine is initiated to start the engine 14. When it is determined that the engine rotation speed $N_E$ is increased to the electric motor rotation speed $N_{MG}$ and synchronized by the self-sustaining operation of the engine 14 after the engine start, the K0 transmission torque $T_{K0}$ set to zero torque until then is controlled to a torque for allowing proper transmission of the engine torque $T_E$ toward the drive wheels 34.

The start type 5 is the engine start by the starter motor (not depicted). When the initiation of start of the engine 14 is determined in the start type 5, the starter motor is activated to raise the engine rotation speed $N_E$. When it is determined that the engine rotation speed $N_E$ is raised to a predetermined rotation speed enabling a complete explosion, the engine 14 is started by initiating the engine ignition, the fuel supply, etc. When it is determined that the engine rotation speed $N_E$ is increased to the electric motor rotation speed $N_{MG}$ and synchronized by the self-sustaining operation of the engine 14 after the engine start, the K0 transmission torque $T_{K0}$ set to zero torque until then is controlled to a torque for allowing proper transmission of the engine torque $T_E$ toward the drive wheels 34.

The K0 transmission torque $T_{K0}$ until the engine start is a total torque of an engine friction torque (a compression torque corresponding to pumping loss+a mechanical friction torque corresponding to sliding friction) and engine inertia, for example. An integrated value of the K0 transmission torque $T_{K0}$ is energy from the outside of the engine and corresponds to a workload of the engine connecting/disconnecting clutch K0. A workload of the engine connecting/disconnecting clutch K0 from the initiation of start to the ignition start is energy from the outside of the engine for raising the engine rotation speed $N_E$ against the total torque. A workload of the engine connecting/disconnecting clutch K0 from the initiation of start until the synchronization between the engine rotation speed $N_E$ and the electric motor rotation speed $N_{MG}$ is energy needed to be secured for the engine start and, when this workload is smaller, the EV range can be more expanded.

Since the workload of the engine connecting/disconnecting clutch K0 until the synchronization is set to zero in the start types 4 and 5, the EV range can be expanded to the maximum as depicted in FIG. 6. Since the start types 1 to 3 make a workload of the engine connecting/disconnecting clutch K0 smaller in the order of the start type 1, the start type 3, and the start type 2, the EV range can be expanded in the order of the start type 3 and the start type 2 as compared to the start type 1 minimizing the EV range, as depicted in FIG. 6. In the comparison between the start type 3 and the start type 2, the start type 3 makes the control of synchronizing the engine rotation speed $N_E$ with the electric motor rotation speed $N_{MG}$ easier although the start type 3 requires more time from the initiation of start to the synchronization and the start of the EHV running. Therefore, it can be understood unless the EV range is made smaller in the start type 3, a torque level difference is more easily generated when the EV running is switched to the EHV running.

The start type 1 is susceptible to a compression torque increased at the beginning of the rotation start of the engine 14, as compared to the start types 2 and 3 in which the engine 14 is ignited to cause self-sustaining operation in the course of raising the engine rotation speed $N_E$ to the electric motor rotation speed $N_{MG}$. Therefore, a decompression amount of the engine 14 may be changed in the start type 1 to vary the area of the EV range. For example, when the decompression amount of the engine 14 is larger, since the compression torque is made smaller and the workload of the engine connecting/disconnecting clutch K0 is made smaller, the EV range is expanded as depicted in FIG. 6. The decompression amount is a degree of a decompression state (decomp state) of suppressing the compression of intake air, i.e., pressurization in the cylinder 55, in the compression stroke, for example, and is increased when the opening/closing timing of the intake valve 66 is shifted in the delaying direction, or increased when the larger number of cylinders are in the decomp state.

Although it is proposed that the area of the EV range can be changed depending on a difference in the start type without relying on the electric storage device 54 in this example, the EV range can further be expanded by combining the control of temporarily increasing the output limit Wout of the electric storage device 54 as depicted in FIG. 6.

The area of the EV range can be changed depending on a difference in the start type as described above. For example, the start types 4 and 5 can expand the EV range to the maximum and the start types 1 to 3 can expand the EV range in the order of the start type 3 and the start type 2 as compared to the start type 1. However, the start type 4 has a possibility of the presence of a rotation stop position at which the rotation stop state of the engine 14 is unsuitable for the ignition start and the start type 4 may not necessarily be always available. The start type 5 requires consideration of durability of the starter motor in terms of cost reduction and may not necessarily be always available if the number of times of activation is limited. Since the start types 2 and 3 include starting the ignition in the course of raising the engine rotation speed $N_E$ to the electric motor rotation speed $N_{MG}$, if the electric motor rotation speed $N_{MG}$ is, for example, near the predetermined rotation speed enabling a complete explosion of the engine 14, the start types 2 and 3 are hardly implemented. On the other hand, the start type 1 is a normal type engine starting method that can most stably be implemented. Therefore, if the start types 2 to 5 are not implemented, the start type 1 is implemented. Thus, when the EV range is expanded, it is necessary to determine which start type is available.

In the example depicted in FIG. 6, although the area of the EV range is changed based on the magnitude of the workload of the engine connecting/disconnecting clutch K0, the engine start torque $T_{MG}s$ may be used instead of this workload. Therefore, in the start types 1 to 3 requiring the engine start torque $T_{MG}s$, when the engine start torque $T_{MG}s$ is lower, the EV range is more expanded.

Figure 7:
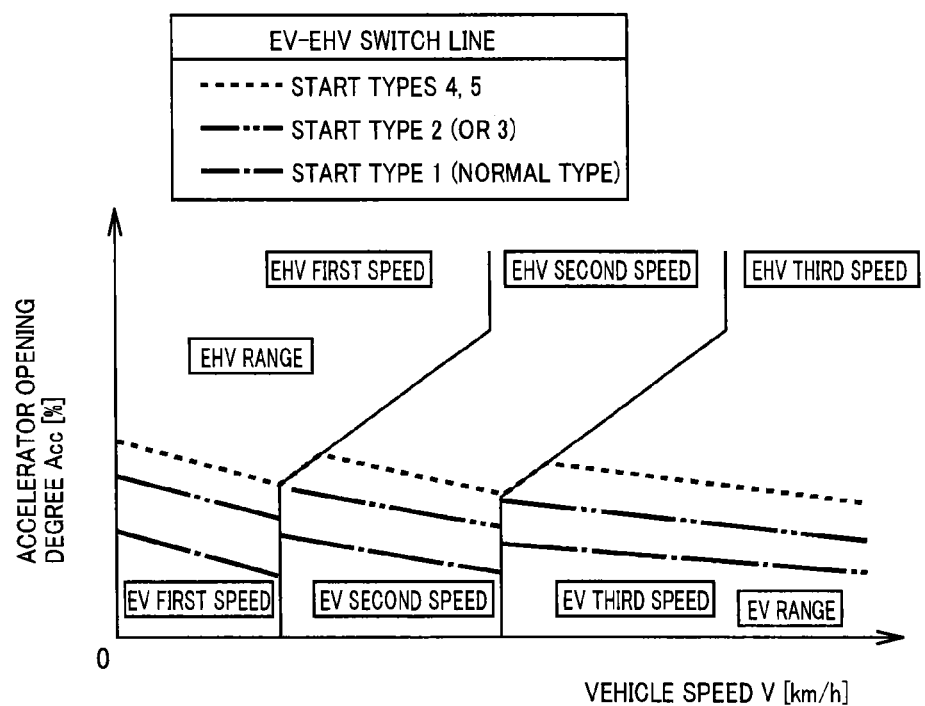
FIG. 7 is a diagram of an EV/EHV range map overlapped with a shift map.

FIG. 7 is a diagram of a relationship having EV-EHV switch lines defining the EV range and the EHV range (an EV/EHV range map) overlapped with a known shift map used for the shift control of the automatic transmission 18. The EV/EHV range map of FIG. 7 is map reflecting that the area of the EV range can be changed depending on a difference in the start type described above. In FIG. 7, a dashed-dotted line is set as the EV-EHV switch line used when the start type 1 is implemented; a dashed-two dotted line is set as the EV-EHV switch line used when the start type 2 (or the start type 3) is implemented; and a broken line is set as the EV-EHV switch line used when the start types 4 and 5 are implemented. The EV-EHV switch lines are set for each shift stage of the automatic transmission 18. Therefore, when the engine 14 is started by the second starting method (the start types 4 and 5), the EV range is expanded as compared to when the engine 14 is started by the first starting method (the start types 1 to 3). This means the phenomenon that when the engine 14 is started by the second starting method (the start types 4 and 5), the drive force enabling the EV running increases as compared to when the engine 14 is started by the first starting method (the start types 1 to 3). In the first starting method (the start types 1 to 3), when the workload of the engine connecting/disconnecting clutch K0 (or the engine start torque $T_{MG}s$) is smaller, the EV range is more expanded. Therefore, when the start types 2 to 5 other than the start type 1 are implemented, the EV range is set to be expanded as compared to the normal EV range set when the start type 1 (normal type) is implemented.

Although the shift lines of the shift map and the EV-EHV switch lines in the EV/EHV range map of FIG. 7 are represented as lines for convenience, the lines are series of points represented by a vehicle state (e.g., the vehicle speed V and the accelerator opening degree Acc) in terms of control. The shift lines have upshift lines and downshift lines as is well known. The EV-EHV switch lines desirably have switch lines for a transition from the EV range to the EHV range and switch lines for a transition from the EHV range to the EV range such that hysteresis is included as is the case with the shift lines. Changing the EV range is to change the EV-EHV switch line and, when it is assumed that the vehicle speed V is the same, this means changing an engine start threshold value (particularly corresponding to the switch line for the transition from the EV range to the EHV range) for determining the engine start in terms of the accelerator opening degree Acc.

More specifically, the hybrid control portion 104 includes a first starting means, i.e., a first starting portion 106, performing the first starting method of starting the engine 14 by using the electric motor MG and a second starting means, i.e., a second starting portion 108, performing the second starting method of starting the engine 14 without using the electric motor MG.

A vehicle state acquiring means, i.e., a vehicle state acquiring portion 110, acquires various vehicle states by processing various signals, for example. Specifically, when the engine 14 is stopped rotating during the EV running, the vehicle state acquiring portion 110 detects a cylinder of the engine 14 located in, for example, the expansion stroke, based on the crank angle $A_{CR}$, the camshaft angle $A_{CA}$, etc. If the vehicle 10 includes the starter motor, the vehicle state acquiring portion 110 acquires an elapsed time from the previous actuation of the starter motor, the number of times of actuation of the starter motor during one trip after the ignition of the vehicle 10 is turned on, etc.

A start control availability determining means, i.e., a start control availability determining portion 112, determines whether the next engine start can be performed by the second starting portion 108 during the EV running. Specifically, when the engine 14 is stopped rotating, the start control availability determining portion 112 determines whether the next engine start can be performed in the start type 4 (i.e., the ignition start) by the second starting portion 108 in the cylinder located in the expansion stroke of the engine 14 detected by the vehicle state acquiring portion 110, based on the crank angle $A_{CR}$ etc., of the engine 14. For example, the start control availability determining portion 112 determines whether the next engine start can be performed in the start type 4, based on whether the actual crank angle $A_{CR}$ is within a predetermined crank angle empirically obtained and stored in advance as a crank angle range for properly performing the ignition start.

If the vehicle 10 includes the starter motor, the start control availability determining portion 112 determines whether the next engine start can be performed in the start type 5 (i.e., the cranking start using the starter motor) by the second starting portion 108, based on an elapsed time from the previous actuation of the starter motor, the number of times of actuation of the starter motor during one trip, etc., detected by the vehicle state acquiring portion 110. For example, the start control availability determining portion 112 determines whether the next engine start can be performed in the start type 5, based on whether the elapsed time, the number of times of actuation, etc., satisfy a predetermined condition empirically obtained and stored in advance in consideration of the durability of the starter motor.

The start control availability determining portion 112 determines whether the next engine start can be performed in the start type 2 (or 3) (i.e., the ignition start in the course of cranking using the electric motor MG) by the first starting portion 106, based on the electric motor rotation speed $N_{MG}$. For example, the start control availability determining portion 112 determines whether the next engine start can be performed in the start type 2 (or 3), based on whether the electric motor rotation speed $N_{MG}$ is equal to or greater than a predetermined electric motor rotation speed higher by a predetermined value than the predetermined rotation speed enabling a complete explosion of the engine 14 empirically obtained and stored in advance as a rotation speed facilitating the implementation of the start type 2 (or 3).

If the start control availability determining portion 112 determines that the next engine start can be performed by the second starting portion 108, the hybrid control portion 104 selects, for example, as the EV-EHV switch line, a line set as the EV-EHV switch line used when the engine start is performed by the second starting portion 108 (the start type 4 or 5) (see the broken line of FIG. 7), thereby expanding the EV range as compared to the normal EV range set when the start type 1 (normal type) is implemented.

In contrast, if the start control availability determining portion 112 determines that the next engine start cannot be performed by the second starting portion 108 and that the next engine start can be performed in the start type 2 (or 3) by the first starting portion 106, the hybrid control portion 104 selects, for example, as the EV-EHV switch line, a line set as the EV-EHV switch line used when the engine start is performed in the start type 2 (or 3) by the first starting portion 106 (see the dashed-two dotted line of FIG. 7), thereby expanding the EV range as compared to the normal EV range set when the start type 1 (normal type) is implemented.

On the other hand, if the start control availability determining portion 112 determines that the next engine start cannot be performed by the second starting portion 108 as well as that the next engine start cannot be performed in the start type 2 (or 3) by the first starting portion 106, the hybrid control portion 104 selects, for example, as the EV-EHV switch line, a line set as the EV-EHV switch line used when the engine start is performed in the start type 1 by the first starting portion 106 (see the dashed-dotted line of FIG. 7), thereby setting the EV range to the normal EV range.

FIG. 8 is a flowchart for explaining a main portion of the control operation of the electronic control device 100, i.e., a control operation for expanding the EV range to improve the fuel efficiency without reduction in drivability, and is repeatedly executed with an extremely short cycle time, for example, on the order of a few msec to a few tens of msec. The flowchart of FIG. 8 is executed during the EV running, for example.

In FIG. 8, first, at step S10 (hereinafter, step will be omitted) corresponding to the vehicle state acquiring portion 110, for example, various signals are processed to acquire various vehicle states. For example, a cylinder of the engine 14 located in the expansion stroke is detected. If the vehicle 10 includes the starter motor, an elapsed time from the previous actuation of the starter motor is acquired along with the number of times of actuation of the starter motor during one trip, etc. At S20 corresponding to the start control availability determining portion 112, it is determined whether the next engine start can be performed by the second starting method during the EV running. For example, it is determined whether the next engine start can be performed in the start type 4 (i.e., the ignition start), when the engine 14 is stopped rotating. If the vehicle 10 includes the starter motor, it is determined whether the next engine start can be performed in the start type 5 (i.e., the cranking start using the starter motor). If it is determined that the next engine start cannot be performed by the second starting method, it is determined whether the next engine start can be performed in the start type 2 (or 3) (i.e., the ignition start in the course of cranking using the electric motor MG) by the first starting method. If it is determined that the next engine start can be performed by the second starting method and the determination of S20 is affirmative, for example, the EV-EHV switch line is set that is used when the engine start is performed by the second starting method (see the broken line of FIG. 7) at S30 corresponding to the hybrid control portion 104, and the EV range is expanded as compared to the normal EV range. Alternatively, if it is determined that the next engine start cannot be performed by the second starting method and that the next engine start can be performed in the start type 2 (or 3) by the first starting method, and the determination of S20 is affirmative, for example, the EV-EHV switch line is set that is used when the engine start is performed in the start type 2 (or 3) by the first starting method (see the dashed-two dotted line of FIG. 7) at S30 corresponding to the hybrid control portion 104, and the EV range is expanded as compared to the normal EV range. On the other hand, if it is determined that the next engine start cannot be performed by the second starting method as well as that the next engine start cannot be performed in the start type 2 (or 3) by the first starting method i.e., the negative determination is made at S20, for example, the EV-EHV switch line is set that is used when the engine start is performed in the start type 1 by the first starting method (see the dashed-dotted line of FIG. 7) at S40 corresponding to the hybrid control portion 104, and the EV range is set to the normal EV range.

As described above, according to this example, if the engine 14 is started by the second starting portion 108 performing the second starting method, the EV range is expanded as compared to when the engine 14 is started by the first starting portion 106 performing the first starting method. As a result, if the engine start is performed by the second starting portion 108 without the need for compensating the engine start with the electric motor MG, the electric motor MG can be operated for the EV running to the drive request amount higher by the portion of the compensation of the engine start (e.g., by the engine start torque $T_{MG}s$) without deteriorating the start shock. In other words, if the engine start is performed by the second starting portion 108, even when the EV running is performed by using the portion of the compensation of the engine start with the electric motor MG, the start shock is not deteriorated. Therefore, the EV range can be expanded to improve the fuel efficiency without reduction in drivability.

According to this example, if it is determined that the next engine start can be performed by the second starting portion 108 when the engine 14 is stopped rotating, the EV range is expanded. As a result, both the engine startability and the expansion of the EV range can be satisfied by deciding the EV range after the starting method of the engine 14 is decided during stop of engine rotation. For example, since the rotation stop position of the engine 14 (the crank angle $A_{CR}$ during stop of engine rotation) is key to the success of engine start for the ignition start, whether the next engine start can be performed by the ignition start can certainly be determined while the engine 14 is stopped rotating and, therefore, both the engine startability and the expansion of the EV range can be satisfied by deciding the EV range after the starting method of the engine 14 is decided during stop of engine rotation, i.e., the start shock is not deteriorated by expanding the EV range.

According to this example, if the engine is started by the first starting portion 106, when the lower engine start torque $T_{MG}s$ is required for rotationally driving the engine 14 with the electric motor MG, the EV range is more expanded. As a result, if the engine 14 is started by the first starting portion 106, the EV range can be expanded as much as possible. Therefore, as compared to uniformly reducing the EV range as compared to the case of starting the engine 14 by the second starting portion 108, the EV range can be expanded to improve the fuel efficiency without reduction in drivability.

According to this example, the area of the EV range can be changed depending on a difference in the start type without relying on the electric storage device 54, which leads to cost reduction. The EV range can further be expanded by combining the control of temporarily increasing the output limit Wout of the electric storage device 54.

According to this example, since the area of the EV range can be changed depending on a difference in the start type, a degree of freedom of control is increased.

Although the example of the present invention has been described in detail with reference to the drawings, the present invention is also applied in other forms.

For example, although the vehicle 10 is disposed with the engine connecting/disconnecting clutch K0 connecting/disconnecting the power transmission path between the engine 14 and the electric motor MG in the example, this is not a limitation. For example, the present invention is applicable to any vehicles having a configuration capable of starting the engine 14 by using an electric motor acting as a drive force source for running even when the engine connecting/disconnecting clutch K0 is not disposed. For example, it is assumed that a vehicle has a differential mechanism coupled to an engine in a power transmittable manner, a first electric motor coupled to the differential mechanism in a power transmittable manner, and a second electric motor coupled to an output rotating member of the differential mechanism in a power transmittable manner and includes a vehicle power transmission device operating as an electric continuously variable transmission when an operating state of the first electric motor is controlled to control a differential state of the differential mechanism. Such a vehicle can perform the EV running with the electric motor while the engine is in a rotation stop state (by applying no load to the first electric motor and by causing the second electric motor to perform power running), for example. The engine rotation speed can be raised to start the engine by the electric motor (by causing the first electric motor to perform power running and by accepting the reactive force thereof with the second electric motor).

In the example, for example, coordination can be achieved with user's operation using an EV switch (not depicted) etc., for performing the EV running. For example, when the EV range is expanded by operating and turning on the EV switch, it is determined whether the starting method (start type) capable of expanding the EV range can be performed and, if the starting method can be performed, the EV range is expanded in accordance with the starting method. For example, coordination can be achieved with a change rate of the accelerator opening degree Acc reflecting the user's operation in the example. For example, when an increase rate of the accelerator opening degree Acc is higher during the EV running, the EV range is desirably narrowed for a prompt shift to the EHV running so as to rapidly generate a larger drive force. Therefore, when the area of the EV range is changed depending on a change rate of the accelerator opening degree Acc, it is determined whether the starting method (start type) capable of changing the area of the EV range can be performed and, if the starting method can be performed, the EV range is changed in accordance with the starting method. As described above, coordination can be achieved with various requests for changing the EV range in this example.

Although the start types 1 to 3 are exemplarily illustrated as the first starting method performed by the first starting portion 106 and the start types 4 and 5 are exemplarily illustrated as the second starting method performed by the second starting portion 108 in the example, when a comparison is made between the case of starting the engine 14 by the first starting method (the first starting portion 106) and the case of starting the engine 14 by the second starting method (the second starting portion 108), at least one start type of the start types 1 to 3 may be used as the first starting method and at least one start type of the start types 4 and 5 may be used as the second starting method. Therefore, the starter motor is not necessary if only the start type 4 (ignition start) is used, and the engine 14 may not be a direct injection gasoline engine if only the start type 5 (cranking start using the starter motor) is used. When a comparison is made among the engine starts using the first starting method, at least two start types of the start types 1 to 3 may be used as the first starting method. However, if the start types 2 and 3 cannot be separated by whether the start types can be implemented, the start types 2 and 3 are not particularly distinguished and, therefore, the start type 1 and either the start type 2 or 3 are used out of the start types 1 to 3. The normal type engine start method is defined as the start type having the narrowest EV range out of the start types used as the first starting method. If the decompression amount of the engine 14 is not changed in the engine start using the first start method (particularly, the start type 1), the intake valve drive device 70 of the engine 14 does not need to include the function of changing the opening/closing timing etc., of the intake valve 66 as needed.

Although the engine start using the second starting method (start types 4 and 5) is independently performed in the example, the engine start may be performed in combination with the engine start using the first starting method (start types 1 to 3). Although this makes the EV range narrower as compared to when the engine start using the second starting method is independently performed, the engine start using the second starting method can more certainly be performed and the next engine start can be performed by the second starting method more often.

If the start types 4 and 5 are used as the second starting method in the example, the start type 4 and the start type 5 may be performed independently of each other or may be performed in a combined manner. Particularly, when the start types 4 and 5 are performed in a combined manner, the engine start using the second starting method can more certainly be performed and the next engine start can be performed by the second starting method more often as compared to when performed independently of each other.

Since the start type 5 requires the inclusion of the starter motor in the example, the start type 4 supportable solely by control is advantageous in terms of cost although included in the same second starting method.

Although the vehicle 10 is disposed with the automatic transmission 18 in the example, the automatic transmission 18 may not necessarily be disposed.

Although the torque converter 16 is used as the hydraulic power transmission device in the example, the torque converter 16 may not necessarily be disposed and another hydraulic power transmission device such as a fluid coupling without a torque amplification effect may be used instead of the torque converter 16.

The above description is merely an embodiment and the present invention may be implemented in variously modified and improved forms based on the knowledge of those skilled in the art.

NOMENCLATURE OF ELEMENTS

10: hybrid vehicle
14: engine (drive force source for running)
55: cylinders
100: electronic control device (control device)
MG: electric motor (drive force source for running)
K0: engine connecting/disconnecting clutch (clutch)

The invention claimed is:
1. A control device of a hybrid vehicle having an engine and an electric motor, the hybrid vehicle being configured to perform motor running using only the electric motor for running and engine running using at least the engine for running, the control device comprising:
a first starting portion starting the engine by using the electric motor;
a second starting portion starting the engine without using the electric motor; and
a start control availability determining portion that determines whether a next engine start can be performed by the second starting portion based on a determined condition of the second starting portion wherein the engine is started with the second starting portion when the start control availability determining portion determines that the next engine start can be performed by the second starting portion, wherein the control device expands a range of performing the motor running when the start control availability determining portion determines that the next engine start is to be performed by the second starting portion as compared to when the next engine start is to be performed by the first starting portion.

2. The control device of a hybrid vehicle of claim 1, wherein the second starting portion injects fuel into a cylinder of the engine during stop of rotation and causes an explosion to start the engine, and wherein if it is determined that the next engine start is performed by the second starting portion during stop of rotation of the engine, the range of performing the motor running is expanded.

3. The control device of a hybrid vehicle of claim 1, wherein the first starting portion starts the engine while the engine is rotationally driven by the electric motor, and wherein when a smaller output torque of the electric motor is required for rotationally driving the engine, the range of performing the motor running is more expanded.

4. The control device of a hybrid vehicle of claim 1, comprising a clutch connecting/disconnecting a power transmission path between the engine and the electric motor, wherein the motor running refers to running with only the electric motor used as a drive force source for running while the clutch is released, wherein the first starting portion starts the engine while the clutch is controlled toward engagement, and wherein the second starting portion starts the engine while the clutch is kept released.

5. The control device of a hybrid vehicle of claim 4, wherein after ignition of the engine, when a rotation speed of the engine is synchronized with a rotation speed of the electric motor a torque of the clutch is controlled to transmit torque from the engine to drive wheels.

6. A control device of a hybrid vehicle having an engine and an electric motor, the hybrid vehicle being configured to perform motor running using only the electric motor for running and engine running using at least the engine for running, the control device comprising:

a first starting portion starting the engine by using the electric motor; and a second starting portion injecting fuel into a cylinder of the engine during stop of rotation and igniting the fuel to cause the engine to rotate and start; and a start control availability determining portion that determines whether a next engine start can be performed by the second starting portion based on a determined condition of the second starting portion wherein the engine is started with the second starting portion when the start control availability determining portion determines that the next engine start can be performed by the second starting portion, the control device being configured to expand a range of performing the motor running when the engine is started by the second starting portion as compared to when the engine is started by the first starting portion.

7. The control device of a hybrid vehicle of claim 6, wherein the cylinder is in an expansion stroke.

8. A control device of a hybrid vehicle having an engine and an electric motor, the hybrid vehicle being configured to perform motor running using only the electric motor for running and engine running using at least the engine for running, the control device comprising:

a first starting portion starting the engine by using the electric motor;

a second starting portion starting the engine by using a starter motor; and a start control availability determining portion that determines whether a next engine start is to can be performed by the second starting portion based on a determined condition of the second starting portion wherein the engine is started with the second starting portion when the start control availability determining portion determines that the next engine start can be performed by the second starting portion, wherein the control device expands a range of performing the motor running when the start control availability determining portion determines that the next engine start is to be performed by the second starting portion as compared to when the next engine start is to be performed by the first starting portion.

* * * * *